United States Patent [19]

Moinard

[11] Patent Number: 5,597,012
[45] Date of Patent: Jan. 28, 1997

[54] VALVE WITH A THRESHOLD WITH RETRACTABLE PUSH ROD

[75] Inventor: Patrice Moinard, Montreuil, France

[73] Assignee: AlliedSignal Europe Services Techniques, Drancy, France

[21] Appl. No.: 313,145

[22] PCT Filed: Sep. 8, 1994

[86] PCT No.: PCT/FR94/01058

§ 371 Date: Sep. 30, 1994

§ 102(e) Date: Sep. 30, 1994

[87] PCT Pub. No.: WO95/09751

PCT Pub. Date: Apr. 13, 1995

[30] Foreign Application Priority Data

Oct. 5, 1993 [FR] France ................... 93 11830

[51] Int. Cl.⁶ .................................................. B60T 8/30
[52] U.S. Cl. ................. 137/505.13; 137/505.15; 137/505.42; 137/508
[58] Field of Search .......... 137/505.13, 505.15, 137/508, 505.42

[56] References Cited

U.S. PATENT DOCUMENTS

| | | | |
|---|---|---|---|
| 3,405,978 | 10/1968 | Lepelletier | 137/505.42 X |
| 3,488,095 | 1/1970 | Rath | 137/505.13 X |
| 4,838,305 | 6/1989 | Reinartz et al. | 137/505.13 |

FOREIGN PATENT DOCUMENTS

| | | |
|---|---|---|
| 2679856 | 2/1993 | France . |
| 2065806 | 7/1981 | United Kingdom . |

*Primary Examiner*—Stephen M. Hepperle
*Attorney, Agent, or Firm*—Leo H. McCormick, Jr.

[57] ABSTRACT

A valve assembly having a body with a bore. The housing has an inlet for communicating pressurized fluid to the bore and an outlet for delivery of the fluid to a system. A piston located in the bore carries a valve element connected to a push rod. The push rod is mounted in the body and can retract into the body and open the valve element in a rest position of the valve to eliminate any shift between the inlet and outlet pressure when the pressure of the fluid is below a predetermined value.

2 Claims, 3 Drawing Sheets

VALVE WITH A THRESHOLD WITH RETRACTABLE PUSH ROD

The present invention relates to a valve with a fluid pressure threshold, capable of producing an outlet pressure which is shifted with respect to an inlet pressure of this fluid, this valve comprising: a body in which is pierced at least one cylindrical bore; a piston defining, in this bore, a first chamber into which there emerges a pressure inlet, and a second chamber into which there emerges a pressure outlet, this piston being capable of sliding in sealed fashion in the bore, from a rest position as far as a limiting position, under the effect of the inlet pressure and counter to a first force which is exerted by first elastic means; a valve element carried by the piston and capable of causing the two chambers to communicate with one another when it is open; and a push rod located in the second chamber facing the valve element and capable of causing the latter to open when this push rod and the valve element are urged towards one another with a force greater than a predetermined opening threshold.

A valve of this type is described, for example, in document FR-A1-2,679,856 and can be used in a braking system, particularly for an electric vehicle.

Despite their certain benefit, this type of valve a prior exhibits the defect, in their initial design, of allowing a residual pressure to remain in the outlet chamber, which residual pressure can be eliminated only by using separately controlled additional means, for example an electromagnet.

The present invention lies within this context and aims to propose simple, inexpensive means capable of eliminating the residual pressure automatically.

To this end, the valve of the invention, made up in accordance to the preamble hereinabove, is essentially characterized in that the push rod closes the second chamber in sealed fashion downstream of the pressure outlet, in that this push rod slides in this second chamber under the effect of the outlet pressure, over a stroke of determined length, and counter to a second force exerted by a second elastic means, which second force is greater than the opening threshold, and in the same direction as the first force, in that the stroke of the push rod is defined between a rest position which this push rod adopts when the piston is in its rest position, and a limiting position of this push rod, in which the latter encounters a stop piece secured to the body, in that this push rod opens the valve element when it is in its rest position, the length of the stroke of the push rod being greater than a relative displacement which the push rod and the piston have to undergo from their rest position in order to close the valve element, and in that the rest position and the limiting position of the piston are separated by a distance at least equal to that which separates the position of the push rod for which the valve element closes from the limiting position of this push rod in which the latter encounters the stop piece.

Moreover, the production of this valve is greatly simplified by making provision for the piston and the push rod to be subjected, by the outlet pressure, to respective forces which are exerted on different pressure cross-sections respectively, the pressure cross-section of the piston being greater than the pressure cross-section of the push rod.

Other characteristics and advantages of the invention will emerge clearly from the description thereof which is given hereafter, by way of non-limiting example, with reference to the appended drawings in which.

Figure 1:
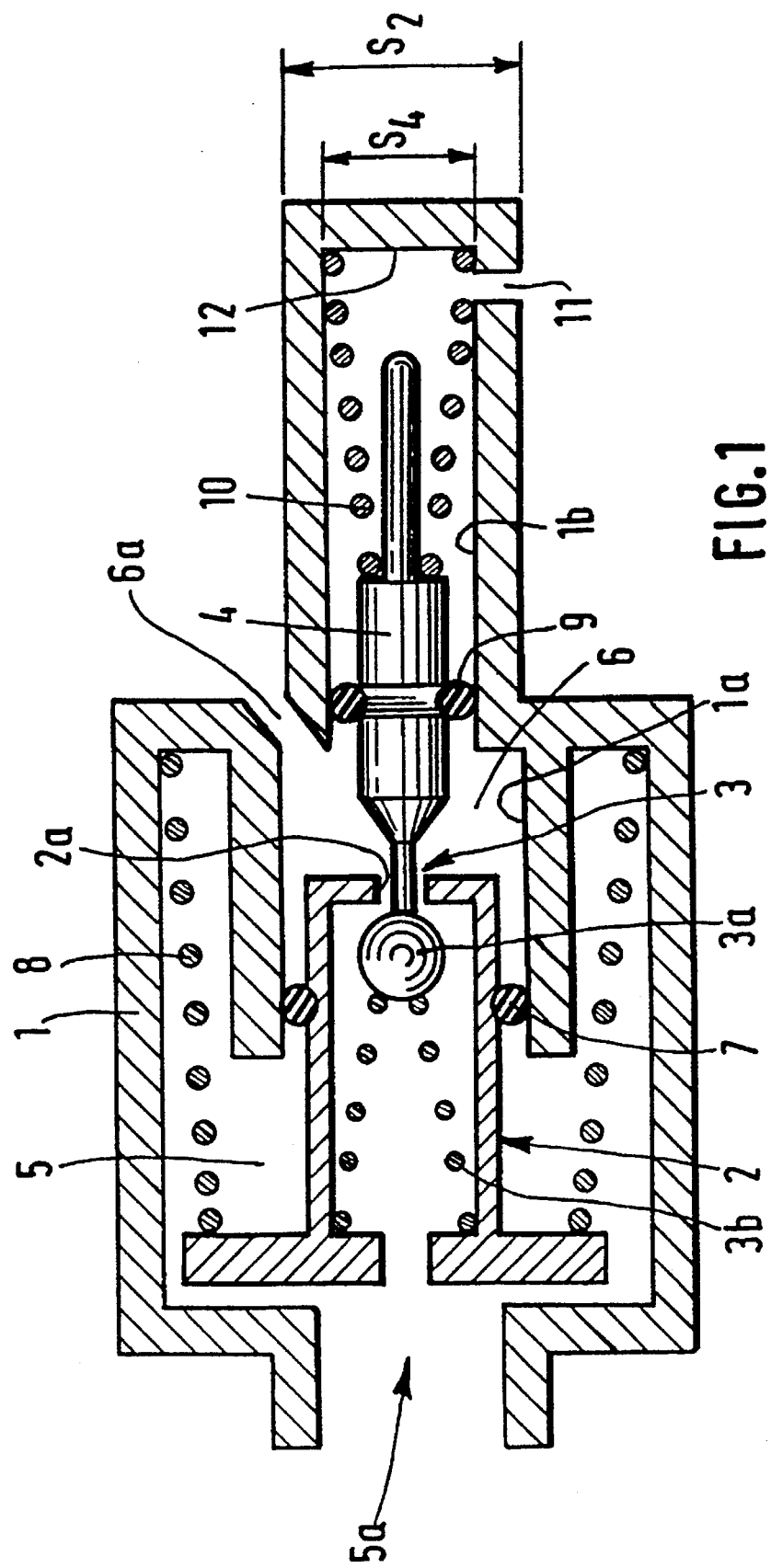
FIG. 1 is a sectional view of a valve in accordance with the invention, represented in rest position.

As shown in FIG. 1, the valve of the invention essentially comprises a body 1; in which is pierced at least one cylindrical bore 1a, 1b, a piston 2, a valve element 3, and a push rod 4.

The piston 1 defines, in the bore 1a, a first chamber 5 into which there emerges a pressure inlet 5a connected to a variable-pressure hydraulic fluid source (not represented), and a second chamber 6 into which there emerges a pressure outlet 6a connected to a circuit for using this pressurized fluid, the valve having the function of allowing a substantial increase in the outlet pressure only with a certain delay with respect to an initial increase in the inlet pressure.

Figure 2:
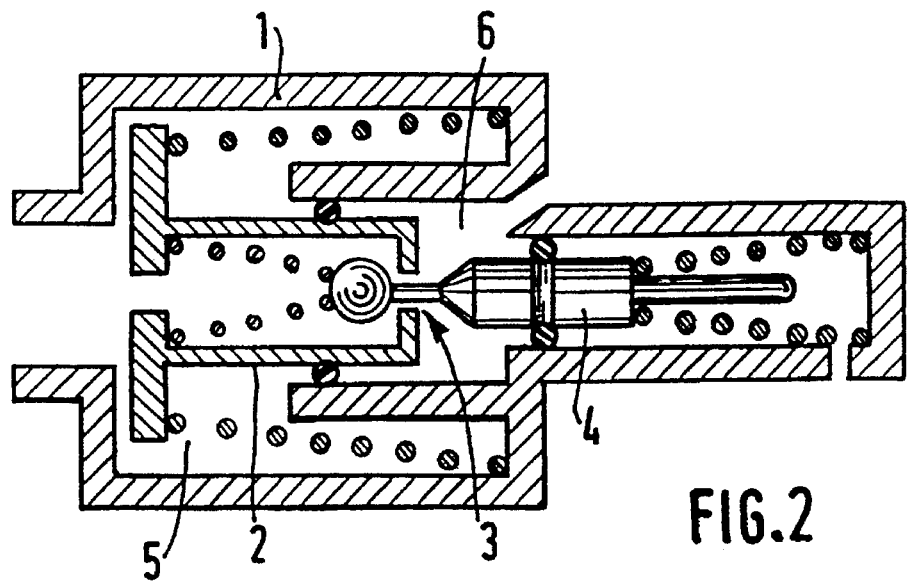
FIG. 2 is a reduced view similar to FIG. 1.
Figure 4:
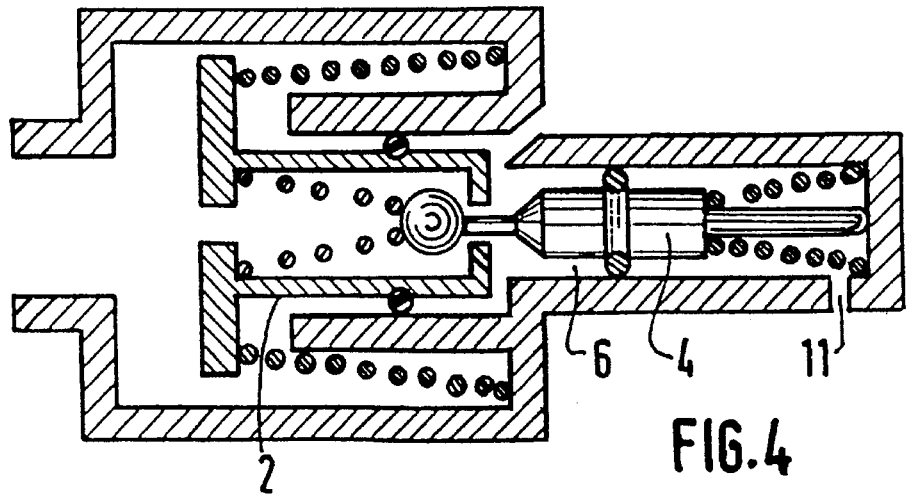
FIG. 4 is a reduced view similar to FIG. 1, in which the valve is represented at the end of operation.

The piston is capable of sliding in the bore 1a, in sealed manner by virtue of the presence of an annular seal 7, from a rest position which is represented in FIGS. 1 and 2, as far as a limiting position which is represented in FIG. 4, under the effect of the inlet pressure and counter to a first force which is exerted by a first spring 8.

The valve element 3 is carried by the piston 2 and, when it is open, allows the two chambers to be made to communicate with one another through the piston 2. In the embodiment illustrated, this valve element essentially consists of a ball 3a urged by a spring 3b against an orifice 2a of the piston.

The push rod 4 is located in the second chamber 6, facing the valve element 3, and makes it possible to cause the latter to open when this push rod and the valve element 3 are urged towards one another with a force which is greater than a predetermined opening threshold corresponding to the force exerted by the valve element spring 3b.

As shown in FIG. 1, the push rod 4, interacting with a seal 9, closes the second chamber 6 in sealed fashion downstream of the pressure outlet 6a, the latter therefore opening between the seals 7 and 9.

More precisely, the push rod 4 slides in the bore 1b which at least partially delimits the second chamber, being subjected, on the one hand, to the effect of the outlet pressure which is exerted on its cross-section S4, and, on the other hand, to the antagonistic effect of a second spring 10 located in the bottom of the bore 1b, the latter opening to the atmosphere through an orifice 11.

The force exerted by the second spring 10 is greater than the opening threshold of the valve element 3, and in the same direction as the force exerted by the first spring 8.

Figure 3:
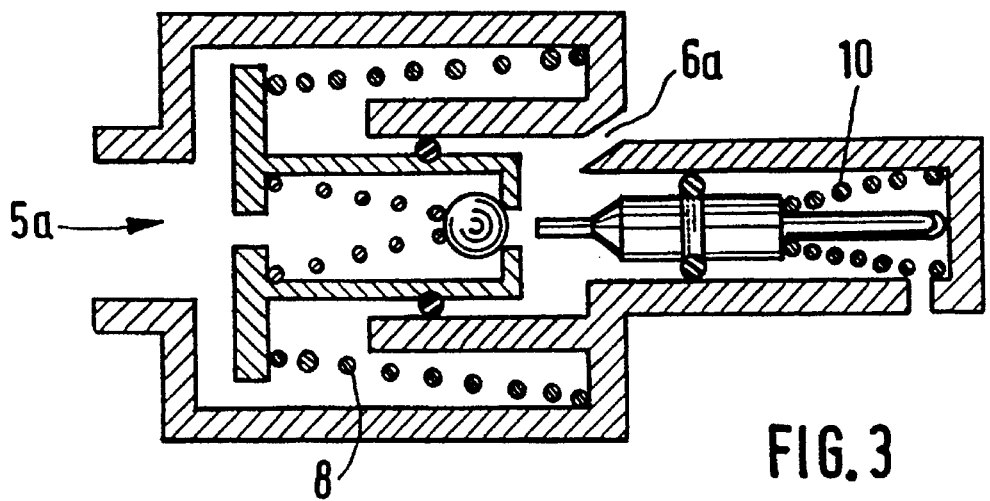
FIG. 3 is a reduced view similar to FIG. 1, in which the valve is represented during operation.

The push rod 4 is capable of being displaced in the chamber 6 over a stroke of determined length, which is defined between a rest position, as represented in FIGS. 1 and 2, and which this push rod adopts when the piston 2 is itself in its rest position, and a limiting position, as represented in FIGS. 3 and 4, and in which this push rod encounters a stop piece 12 secured to the body 1 of the valve.

As shown in FIGS. 1 and 2, the push rod 4, pushed by the second spring 10, opens the valve element 3 when it is in its rest position.

However, the second spring 10 makes the push rod 4 retractile, the length of the stroke which it is allowed being greater than the relative displacement which this push rod and the piston 2 must undergo from their rest position in order to close the valve element 3.

Moreover, the rest position and the limiting position of the piston 2 are separated by a distance which is at least equal to that which separates the position of the push rod for which the valve element 3 closes from the limiting position of this push rod 4, in which the latter encounters the stop piece 12.

Finally, according to an optional but advantageous characteristic of the invention, the piston and the push rod are subjected, by the outlet pressure, to respective forces which are exerted on different pressure cross-sections S2 and S4 respectively, the pressure cross-section S2 of the piston 2 being greater than the pressure cross-section S4 of the push rod 4.

The operation of the valve which has just been described is illustrated in FIGS. 2 to 5, Po denoting, in this latter Figure, the inlet pressure, and P1 denoting the outlet pressure.

Figure 5:
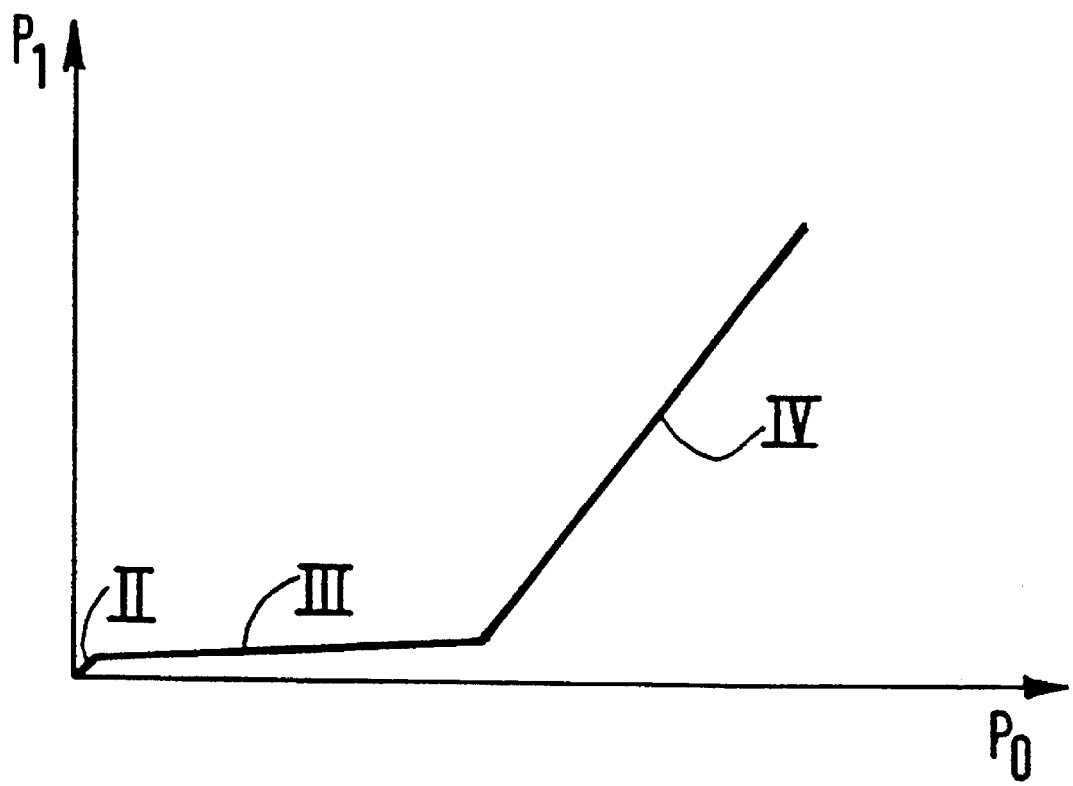
FIG. 5 is a pressure diagram, representing the operation of the valve.

In the rest position of the valve, which corresponds to a zero inlet pressure (FIG. 2), the inlet chamber 5 and outlet chamber 6 are made to communicate via the open valve element 3, so that any increase in the inlet pressure is manifested in an identical increase in the outlet pressure, this operating stage being identified by the reference II in FIG. 5.

However, the increase in the outlet pressure, acting on the cross-section S4 of the push rod pushes the latter back towards the stop piece 12 thereby compressing the second spring 10, up to a point which corresponds to a situation which is intermediate between those of FIGS. 2 and 3, in which the valve element 3 closes.

The subsequent rise in the inlet pressure displaces the piston 2 towards the push rod thereby compressing the first spring 8. However, the push rod 4 is itself urged towards the stop piece 12 by the fluid displaced in the chamber 6 and subjected to the outlet pressure, this push rod 4 being displaced all the faster with respect to the piston 2 as the ratio of the cross-sections S2/S4 increases, and is finally halted by the stop piece 12. This operating step is illustrated in FIG. 3, and identified by the reference III in FIG. 5.

Insofar as the subsequent increase in the inlet pressure continues to push the piston 2 towards the push rod 4, whilst the latter is in abutment, the valve element 3 ends up coming into contact with the push rod again. The resultant opening of the valve element, and the outflow of fluid from the first chamber towards the second therefore allows a rise in the outlet pressure, this operating step being illustrated in FIG. 4, and identified by the reference IV in FIG. 5.

I claim:

1. A valve assembly having a fluid pressure threshold for producing an outlet pressure which is shifted with respect to an inlet pressure of for a fluid, said valve assembly comprising: a body in which is pierced with at least one cylindrical bore; a piston defining in said bore, a first chamber into which there emerges a pressure inlet, and a second chamber into which there emerges a pressure outlet, said piston being capable of sliding in sealed fashion in said bore, from a rest position as far as a limiting position, under the effect of the inlet pressure and counter to a first force which is exerted by first elastic means; a valve element carried by said piston and capable of causing said first and second chambers to communicate with one another when said valve element is open; and a push rod located in said second chamber and having a surface facing said valve element and capable of causing said valve element to open when said push rod and said valve element are urged towards one another with a force greater than a predetermined opening threshold, said valve assembly being characterised in that said push rod closes said second chamber in sealed fashion downstream of the pressure outlet and said push rod slides in this second chamber under the effect of the outlet pressure over a stroke of determined length, and counter to a second force exerted by a second elastic means, said second force being greater than said opening threshold and in the same direction as said first force, said stroke of said push rod being defined between said rest position which this push rod adopts when said piston is in a rest position and a limiting position of said push rod in which said push rod encounters a stop piece secured to said body, said push rod opening said valve element when it a rest position, the length of the stroke of said push rod being greater than a relative displacement which said push rod and said piston have to undergo from their respective rest positions in order to close the valve element, and said rest position and said limiting position of the piston are separated by a distance at least equal to that which separates the position of said push rod for which said valve element closes from a limiting position of said push rod in which said push rod encounters said stop piece.

2. The valve assembly according to claim 1, characterised in that said piston and said push rod are subjected to said outlet pressure and develop different respective forces as a result of different pressure cross-sections, said pressure cross-section of said piston being greater than the pressure cross-section of said push rod.

\* \* \* \* \*